United States Patent
Becker et al.

(10) Patent No.: US 8,398,105 B2
(45) Date of Patent: Mar. 19, 2013

(54) METHODS AND APPARATUS FOR SUSPENSION DAMPING WITH REDUCED CAVITATION AND EFFECTS

(75) Inventors: William M. Becker, Aptos, CA (US); Sante M. Pelot, Aptos, CA (US); Joseph Franklin, Vancouver, WA (US)

(73) Assignee: Fox Factory, Inc., Scotts Valley, CA (US)

( * ) Notice: Subject to any disclaimer, the term of this patent is extended or adjusted under 35 U.S.C. 154(b) by 658 days.

(21) Appl. No.: 12/493,412

(22) Filed: Jun. 29, 2009

(65) Prior Publication Data

US 2009/0322054 A1 Dec. 31, 2009

Related U.S. Application Data

(60) Provisional application No. 61/077,003, filed on Jun. 30, 2008.

(51) Int. Cl.
*B62K 21/02* (2006.01)
(52) U.S. Cl. .................. 280/276; 188/289
(58) Field of Classification Search .......... 188/266, 188/266.2–266.5, 285, 289; 280/275, 276
See application file for complete search history.

(56) References Cited

U.S. PATENT DOCUMENTS

| | | | | |
|---|---|---|---|---|
| 1,833,940 A | * | 12/1931 | Gibbs | 188/289 |
| 3,033,323 A | * | 5/1962 | La Manna | 188/313 |
| 3,152,667 A | * | 10/1964 | Powell | 188/289 |
| 4,406,640 A | | 9/1983 | Franklin et al. | |
| 5,398,788 A | * | 3/1995 | Lizell | 188/266.3 |
| 5,521,821 A | * | 5/1996 | Shimizu et al. | 701/37 |
| 5,779,007 A | * | 7/1998 | Warinner | 188/289 |
| 5,971,116 A | * | 10/1999 | Franklin | 188/282.4 |
| 5,984,423 A | | 11/1999 | Becker | |
| 6,073,736 A | | 6/2000 | Franklin | |
| 6,217,049 B1 | | 4/2001 | Becker | |
| 6,234,505 B1 | | 5/2001 | Ito | |
| 6,592,136 B2 | * | 7/2003 | Becker et al. | 280/276 |
| 7,134,534 B2 | | 11/2006 | Chen | |
| 7,163,222 B2 | | 1/2007 | Becker et al. | |
| 7,722,069 B2 | * | 5/2010 | Shirai | 280/276 |
| 2007/0080515 A1 | * | 4/2007 | McAndrews | 280/276 |
| 2007/0119672 A1 | | 5/2007 | Becker | |
| 2009/0243251 A1 | | 10/2009 | Galasso et al. | |

\* cited by examiner

*Primary Examiner* — Christopher Schwartz
(74) *Attorney, Agent, or Firm* — Patterson & Sheridan, L.L.P.

(57) ABSTRACT

A method and apparatus for reducing cavitation and its effects in a damper. The damper includes a flow dividing structure. In one embodiment, the structure is disposed in a valve including an annular flow path constructed and arranged to separate fluid into substantially separate streams as the fluid passes through the annular path.

25 Claims, 3 Drawing Sheets

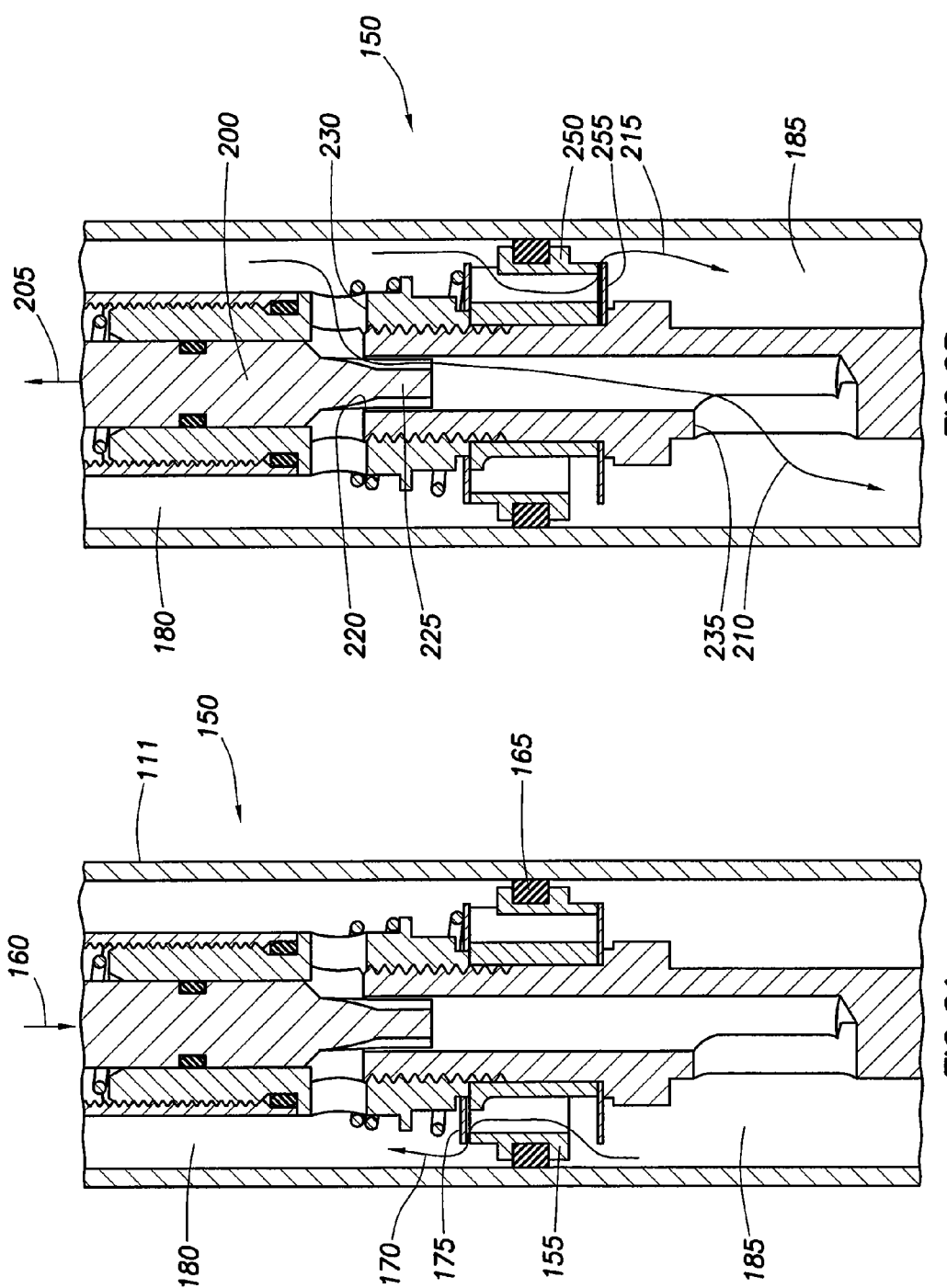

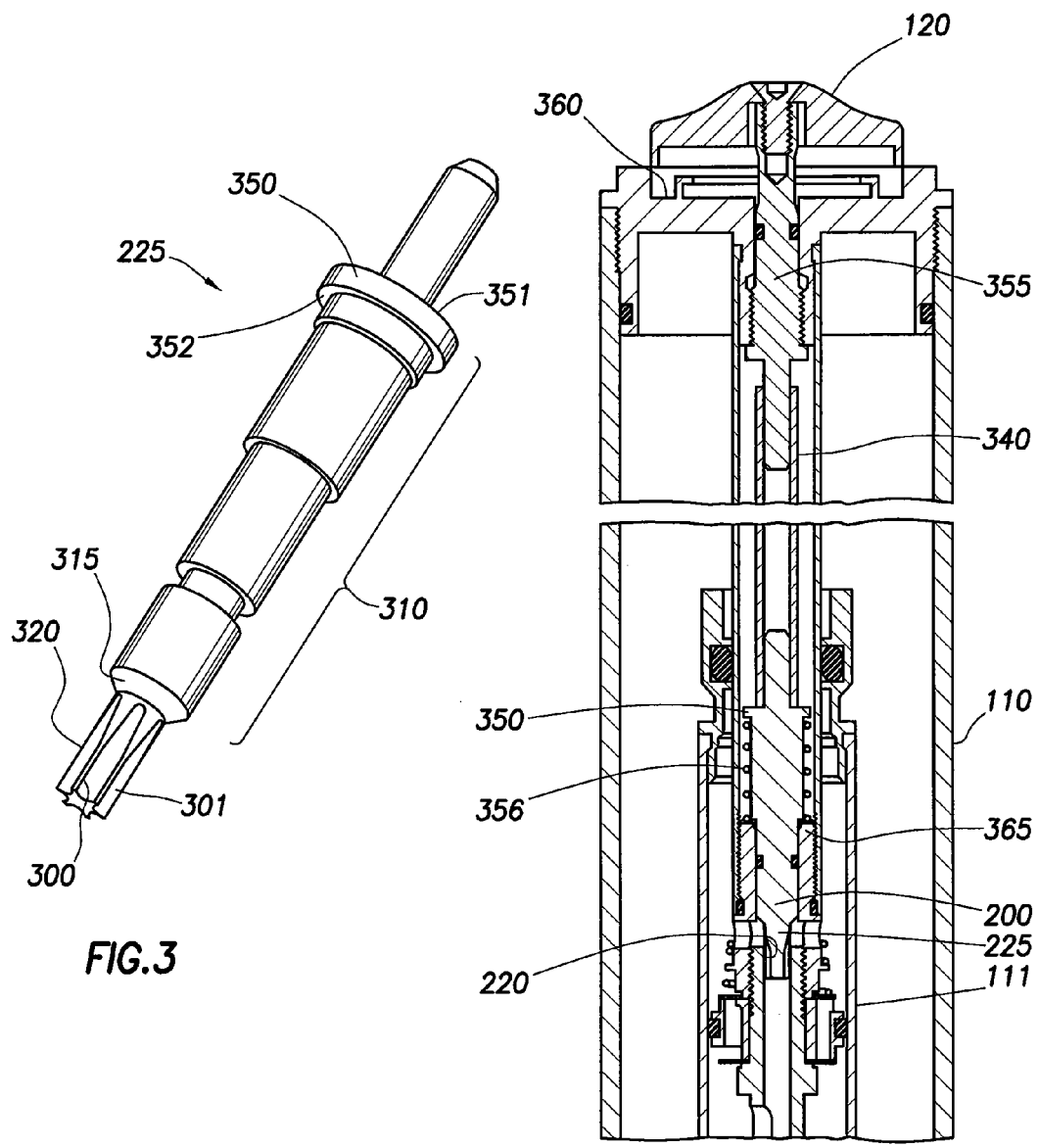

METHODS AND APPARATUS FOR SUSPENSION DAMPING WITH REDUCED CAVITATION AND EFFECTS

CROSS-REFERENCE TO RELATED APPLICATIONS

This application claims benefit of U.S. provisional patent application Ser. No. 61/077,003, filed Jun. 30, 2008, which is herein incorporated by reference.

BACKGROUND OF THE INVENTION

1. Field of the Invention

The present invention relates to shock absorbers. More particularly, the invention relates to a damper for a shock absorber that meters fluid while reducing the effects of cavitation typically associated with annular flow paths of fluid through metering systems. More particularly still, the invention relates to reducing cavitation and the effects of cavitation in a front fork assembly for a two wheeled vehicle.

2. Description of the Related Art

An integral shock absorber usually consists of two parts: a spring and a damper. The spring may include a steel or titanium coil, an elastomer, or even compressed gas. A typical hydraulic damper creates a damping effect by inhibiting the flow of oil through specific regions of the device, such as a piston that moves in a dampening chamber.

Dampers are used in vehicle front and rear shock absorbers. FIG. 1 shows a front fork 100 for a two wheeled vehicle such as a bicycle (not shown). The fork 100 includes two telescopic tubes 105, 110, and a brace 115 to help keep the tubes parallel to one another in use.

In a typical fluid operated damper, the damping fluid flow is inhibited by forcing fluid through a restrictive area or orifice, which effectively slows the movement of the damper during the compression and rebound strokes. In one arrangement, the fluid is inhibited as it moves through a needle valve having a restricted annular area formed between a smooth tapered needle member and a smooth seat. As the fluid moves through the restriction, the fluid velocity increases substantially and a corresponding pressure drop occurs across the needle valve. If the pressure of a liquid damping fluid is reduced below the fluid vapor pressure of that fluid (e.g. oil), by high velocity flow for example, vapor bubbles will form and then collapse when they subsequently enter a region of pressure above the fluid vapor pressure. Cavitation, or the formation and collapse of bubbles in such a reduced pressure area, may cause noise and/or damage to the surrounding part surfaces. Such cavitation depends on the initial fluid pressure and the amount of pressure reduction. At higher initial fluid pressures cavitation is less likely because a larger pressure reduction is required to reach fluid vapor pressure (which is a constant at constant temperature). Cavitation noise can be undesirable in certain applications such as on a bicycle. A bicycle rider can encounter many successive bumps in a short amount of time. In this situation the rider must concentrate intently to avoid crashing. The repetitive noise coming from the damper can cause a distraction which could potentially cause the rider to lose concentration and subsequently lose control of the bicycle. Additionally, the noise can be an annoyance as bicycles are typically very quiet. Such noise can also detract from a user's perception of quality or robustness of a bicycle and associated components.

Dampers may also be used on machines in factories to control machine motion and vibration. In a factory setting a damper may be installed on a cyclically operating machine. Workers may have to work near the machine for hours in succession and the noise could potentially cause damage to a worker's ears. Moreover, the collapsing of bubbles can generate extremely high localized energy which can damage part surfaces within the damper. Cavitation damage and "explosive" cavitation damage (referring to the sudden implosion of cavitation bubbles) to fluid adjacent parts are well documented. Thus, a simple solution for reducing cavitation or the magnitude of cavitation events in a damper is very desirable.

SUMMARY OF THE INVENTION

In one embodiment a damping mechanism in a hydraulic shock absorber reduces cavitation and its effects, thus limiting audible noise, and also reducing turbulence (thereby improving smoothness and consistency of damping). The mechanism consists of a fluid flow path having a flow dividing structure therein whereby the fluid is divided in such a way that lowers the cavitation magnitude and its effects in the damping region of a shock absorber. Such lowered cavitation can reduce audible noise and turbulence. One embodiment provides a means of reducing cavitation, audible noise, and turbulence in the adjustable damping region(s) of an adjustable shock absorber by dividing the fluid flow into multiple smaller flow paths. The needle is mounted in such a way that it can move axially in and out of the orifice, thus varying the cross-sectional area of the flow path through the orifice, and thereby varying the resultant damping of the shock absorber. In one embodiment, the needle has multiple grooves on the tapered outer diameter thereof. The grooves taper toward the axis of the needle and divide the flow path, through the orifice and around the needle, into multiple flow paths. The result is a smoother functioning damper.

BRIEF DESCRIPTION OF THE DRAWINGS

FIG. 2A is a section view of a damper assembly showing fluid being metered during a compression stroke of the fork.

FIG. 2B is a section view of the damper assembly of FIG. 2A showing fluid being metered by a needle valve and a high speed valve during a rebound stroke of the fork.

FIG. 3 is a perspective view of a valve needle having formations formed on an outer surface thereof.

FIG. 4 is a section view showing a user-adjustable feature usable with the needle valve.

DETAILED DESCRIPTION

Figure 1:
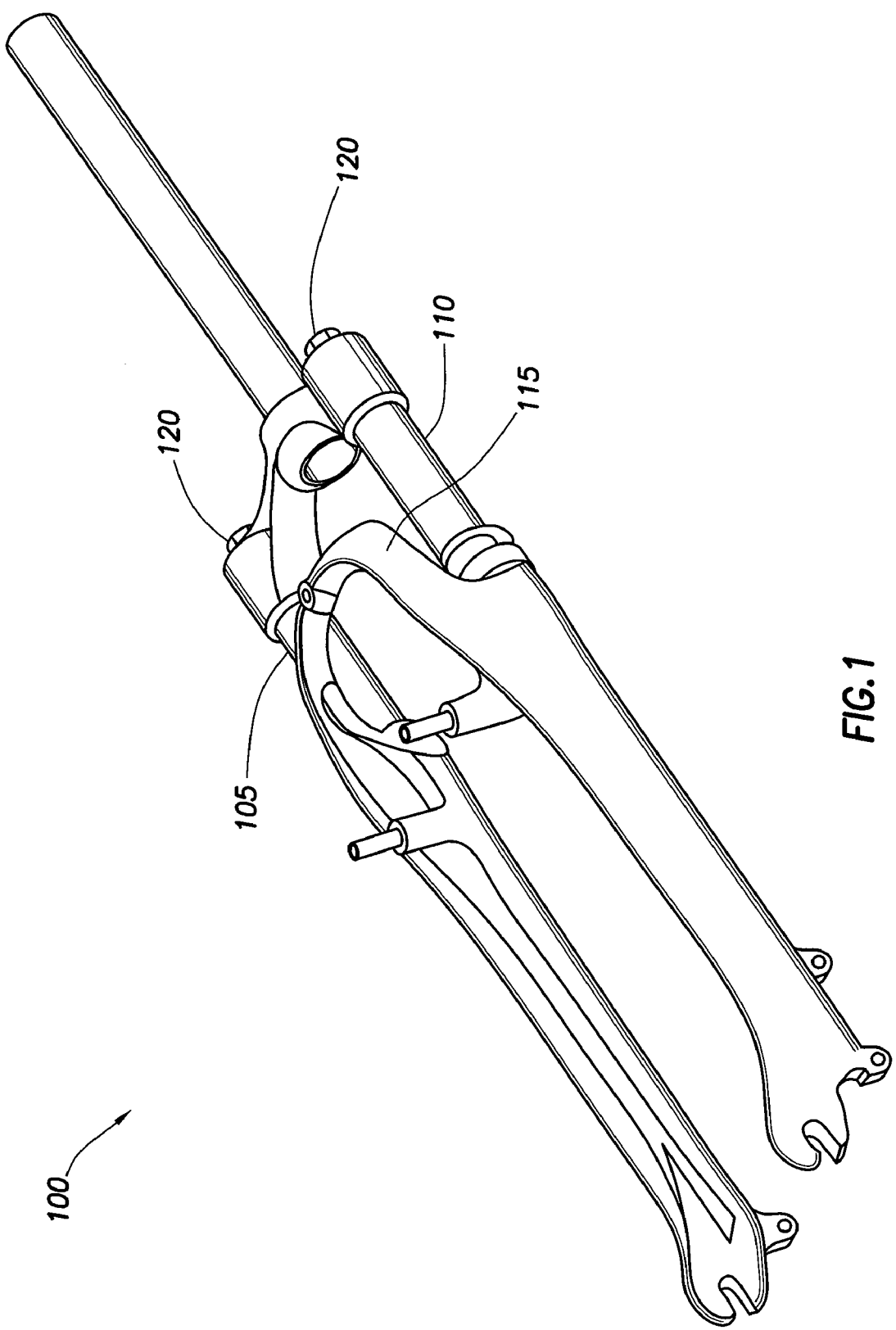
FIG. 1 is a perspective view of a front fork having a spring and damper therein.

FIG. 2A is a section view of a damper assembly 150 disposed in a chamber 111 housed within a tube (not shown) of a front fork assembly. The Figure shows fluid being metered along a path 170 during a compression stroke of the fork. In the compression stroke, a piston 155 moves downward relative to chamber 111. The downward movement direction is shown by arrow 160. The piston includes an annular seal 165 therearound for sealing with the inner diameter of chamber 111 and various metering paths therethrough. As shown by fluid path 170, in the compression stroke, fluid is metered through the piston 155 and past a shim 175 that normally closes a path upwards into a rebound section 180 of the fluid filled chamber. During the compression stroke, fluid also passes from a compression section 185 of the chamber through various other metering devices, to an annular reservoir (not shown).

FIG. 2B is a section view of the damper assembly 150 of FIG. 2A showing other features operable during a rebound stroke, including a needle valve 200 and a high speed valve 250. The movement direction of the piston during the rebound stroke is shown by arrow 205. Fluid paths 210 and 215 are possible flow paths for fluid during a rebound stroke of the piston. The needle valve 200 includes a seat 220 and a needle 225 that can assume a closed position relative to the seat or a number of selectable open positions (e.g. infinitely variable) wherein fluid is permitted to pass through an annular area formed between the seat 220 and the needle 225. In FIG. 2B, the needle is shown in an open position permitting fluid to flow from the rebound side 180 of the chamber into a port 230 and through the annular area formed by the valve 200 as shown by arrow 210. After passing through the valve, the fluid continues to the compression side of the chamber through another port 235. Also illustrated in FIG. 2B is a "high speed" valve 250 designed to open only in the event of relatively high pressure usually associated with rapid movement of the shock absorber in the rebound direction 205. As shown, the high speed valve consists of a shim 255 that is deformable at a predetermined pressure, thereby opening a fluid path past the shim 255 and through the high speed valve 250.

Cavitation and its effects are of particular issue in low ambient pressure systems (e.g. near atmospheric static pressure) such as two wheeled vehicle forks. Unlike many rear shock absorber dampers that operate at elevated (above atmospheric) internal static pressures, forks often rely on open bath or low pressure (e.g. atmospheric) damper systems where moderate velocity induced pressure drops can cause cavitation (although the flow splitting mechanism and method disclosed herein are equally well suited for use in higher ambient pressure damping systems). Cavitation and its effects are reduced by features of the invention that include a flow dividing structure. In one aspect, the needle valve divides fluid passing through it into separate flow streams due to formations that run axially along the annular area formed between the seat 220 and the needle 225. FIG. 3 is a perspective view of one embodiment of a needle 225 for use in needle valve 200. The needle 225 includes a mounting portion 310, a sealing surface (typically a bevel or shallow taper) 315 for sealing with seat 220, when the valve is closed, and an end portion 320 that extends into the valve seat 220 and creates a divided annular flow path (i.e. flow paths) for fluid traveling through the open valve 200. Formed along the end portion 320 are formations 300. In one embodiment, the formations 300 consist of spline-shapes 301 longitudinally formed along the tapered outer surface of the needle end 320. The purpose of the formations 300 is to divide the annular flow of fluid moving through the open valve into substantially separate streams, and in doing so, to reduce the magnitude of occurrence and effects of cavitation.

In one embodiment the mechanism of the formations 300 on the needle end 320 (or on the seat 220 or on both) causes a first pressure reduction proximate the entrance of the annular area comprising the formations 300 where such pressure drop is greater than that which would occur with the smooth annular area absent the formations 300 (e.g. for example: the formations, including relatively large full diameter flats for creating a more abrupt flow regime split, create stagnant regions between divided flow regimes that result in slightly increased back pressure and hence a pressure drop across that region). A second pressure drop occurs through the channels of the needle end 320. Because the pressure drop is staged between two locations, the likelihood of cavitation is reduced. At high enough velocities, any cavitation that occurs will be of a reduced magnitude versus a standard single pressure drop flow regime.

In one aspect, the formations 300 are located along the needle end 320 and fluid passing through the valve is divided into separate steams prior to reaching a velocity where vaporization occurs. Because the separate streams of fluid are of a smaller cross-sectional area, any resulting vapor bubbles created due to cavitation will also be smaller. Such smaller bubbles generate less shock as they collapse and re-enter the fluid.

In one embodiment, the combined areas of the separate and smaller flow paths have approximately the same effective cross-sectional area for any given axial needle position as a conventional tapered needle would when extended into the same orifice in the same axial position. The divided flow allows for substantially the same total flow as a "smooth" needle in the same orifice and therefore affords substantially the same damping effect but with less effect of cavitation. By sectioning the flow path through the orifice, the multiple formations inhibit the growth of large cavitation bubbles, thus reducing large scale cavitation and associated noise or damage. The total cross-sectional area of the formations 300 can be varied (e.g. increased) slightly to account for increased fluid drag associated with the increased needle surface area created by the formations. Another benefit of dividing the flow is turbulence reduction. Turbulent flow is associated with high Reynolds numbers for a given system. The Reynolds number is given as $Re = pvd/\mu$ where p is the fluid density, v is the fluid velocity, d is the hydraulic diameter, and $\mu$ is the fluid dynamic viscosity. Thus, by dividing the flow into multiple smaller areas, the same fluid velocity is achieved, each with smaller hydraulic diameters than a single annular flow path having the same flow area (and same damping characteristics otherwise) in conjunction with a given orifice. These separated flow paths each have a lower Reynolds numbers than a single flow path, creating flow that is more laminar (less turbulent) and therefore easier to predict and control.

While the example of FIG. 3 includes spline-shaped formations 301 formed on the surface of the needle 225, the formations can take a variety of forms and can be formed on the needle 225, the seat 220 or both in order to more effectively produce separate streams of fluid in the area of the needle valve 200. In another variation, for example, the seat 220 includes formations running between an upper edge to a lower edge. In another variation, co-operating formations are formed on the needle 225 and the seat 220, resulting in a more tubular-shaped set of paths for the fluid. In yet another variation, the paths are formed in a slightly spiraled manner (e.g. thread form) to swirl the fluid as it moves through the annular area of the valve. In another embodiment the formations take the form of added material rather than appearing as they have been formed by removal of material from an otherwise cylindrically-shaped needle.

FIG. 4 is a section view showing a user-adjustable feature usable with the needle valve. In FIG. 4, the valve 200 and its user adjustable features are shown in an open position with an annular flow path formed between the needle 225 and the seat 220 of the valve 200. A top cap 120 has a threaded shaft 355 connected on its underside permitting the cap and shaft to move axially in relation to fork tube 110. The fork tube has a recessed area 360 under the cap 120 to permit the cap to be partially housed within the recess when the cap/shaft 355 is threaded downwards to move the valve toward a closed position. A lower end of the shaft 335 is fitted to another shaft 340 that extends down and contacts an upper facing surface 351 of a flange 350 formed on needle 225 (see also FIG. 3). A downward facing side 352 of the flange supports one end of a spring 356 where an opposite end of the spring is retained by a stationary shoulder 365 formed in the valve body. In this manner, the compressed spring 355 acts to urge or bias the needle upwards away from seat 220 to an open position.

The needle 225 is moved towards a closed position as the cap 120 is rotated and the shafts 355, 340 move downwards, pushing the flange 350 of the needle 225 against the spring 355. Conversely, the needle is moved towards an open position when the cap 120 is rotated an opposite direction and the assembly therebelow is permitted to move upwards. FIGS. 2A, 2B and 4 show the needle valve in an open position. In one embodiment, when the needle valve is closed, valve shoulder 315 contacts seat 220 preferentially forming a circumferential line seal contact about a circumference on shoulder 315 that corresponds to a diameter of the seat 220.

During operation, the damper leg of the fork (or damper of an appropriate shock absorber) is subject to loads causing compression and rebound of the damper. The compression is often induced by disparities (e.g. bumps) in the terrain being traversed by a vehicle equipped with the fork. The rebound is often induced by a spring (e.g. gas spring, mechanical spring, coil—not shown), located, in one embodiment, in another tube of the fork, which stores energy during compression of the fork and then releases that energy when the disparity is passed. "Rebound" may also result from traversal of a negative feature in the terrain such as a "dip" or hole. Energy is expended in urging the suspension unit to elongate axially following the axial compression during which the energy is stored. In one embodiment the top cap 120 and its connected parts (as disclosed herein) move with the upper portion of fork tube 110 during compression and rebound and another assembly (not shown) moves with the lower portion of fork tube 110.

In addition to operating during the rebound stroke, the needle valve, when open, also permits fluid to pass through the valve from the compression to the rebound portion of the chamber during the compression stroke. This is in addition to the fluid traversing flow path 170 (see FIG. 2A) and metering devices in a lower portion of the fork that meter fluid to a reservoir (not shown).

In one embodiment, the flow rate of fluid through the needle valve during the compression stroke is minimal because the resistance to flow, from the compression chamber or portion to the rebound chamber or portion, across the piston 155 along flow path 170 is relatively low. Such relatively low resistance results from a very weak or light shim 175 which provides minimal resistance to flow along path 170. Because the resistance to flow along 170 is suitably low, and therefore the pressure differential across the piton 155 during compression is relatively low, the flow rate through the needle valve is correspondingly low. In one embodiment, the flow rate through the needle valve during the rebound stroke is relatively high and the setting of the needle valve substantially controls the rebound rate. In such embodiment the shim 255 is relatively stiff and suitable primarily for opening at very high rebound rates (i.e. high differential pressure across piston 155). In such embodiment a majority of the fluid flow across the piston 155 during rebound traverses the needle valve. In one embodiment the needle valve is highly operative in both compression and rebound as both the compression shim 175 and the rebound shim 255 are relatively stiff and suitable primarily for high speed opening. In one embodiment, both compression 175 and rebound shims 255 are relatively limber and fluid flows through the shims and the needle valve during both compression and rebound.

The adjustable cavitation resistant damper disclosed herein may be used in any suitable suspension product and between any suitable liquid filled reservoirs or between any two portions of a liquid filled chamber.

While the foregoing is directed to embodiments of the present invention, other and further embodiments of the invention may be implemented without departing from the scope of the invention, and the scope thereof is determined by the claims that follow.

The invention claimed is:

1. A suspension damper comprising:
a chamber having a compression portion and a rebound portion, the portions divided by a piston assembly disposed on a rod; and
a valve for providing damping fluid between the rebound and the compression portion, the valve defining an annular flow path and including a needle axially movable relative to a valve seat, wherein the needle includes a sealing surface for obstructing the flow of fluid and a second surface including formations longitudinally formed and tapered toward an axis of the needle and arranged to separate fluid into substantially separate streams as the fluid passes through the annular flow path, the sealing surface tapered at a first angle relative to the axis and the second surface tapered at a second angle relative to the axis.

2. The damper of claim 1, wherein the valve is user-adjustable.

3. The damper of claim 2, wherein the valve is adjusted with a threaded adjustment member located at an upper end of the fork having the damper.

4. The damper of claim 3, wherein the adjustment member operates in conjunction with a shaft to position the needle axially in relation to the valve seat.

5. The damper of claim 4, wherein the valve includes a biasing member that biases the needle in an open position.

6. The damper of claim 5, wherein the biasing member is a spring.

7. The damper of claim 1, wherein the annular flow path is formed between the needle and the valve seat.

8. The damper of claim 7, wherein separate streams of fluid result from formations formed on an inner surface of the valve seat.

9. The damper of claim 1, wherein the damper is disposed in a front fork assembly of a bicycle.

10. The damper of claim 9, wherein the front fork assembly includes one fork having the damper and another fork having a spring.

11. The damper of claim 1, further including a high speed metering device for operation separately or in combination with the valve.

12. The damper of claim 11, wherein the high speed metering device operates with a shim that is deformable to open a fluid path through the high speed valve.

13. The damper of claim 1, wherein the formations are spline-shaped formations formed parallel to the direction of fluid flowing through the valve.

14. The damper of claim 1, wherein the valve is disposed in the piston assembly.

15. A suspension damper comprising:
a first chamber containing a damping fluid;
a second chamber containing damping fluid;
a fluid flow path between the first and second chambers for conducting at least some of the damping fluid in response to at least one of a compression or extension of the damper; and a valve at least partially obstructing the flow path, the valve including a needle axially movable relative to a valve seat, wherein the needle includes a sealing surface for obstructing the flow of fluid and a second surface including formations longitudinally formed and tapered toward an axis of the needle, the sealing surface tapered at a first angle relative to the axis and the second surface tapered at a second angle relative to the axis.

16. The damper of claim 15, wherein the formations consist of spline-shapes that separate fluid flow into separate streams as the fluid passes through the flow path.

17. The damper of claim 15, wherein the valve is axially movable between a first position that substantially prevents the damping fluid from flowing between the first and second chambers, and a second position that allows the damping fluid to flow between the first and second chambers.

18. The damper of claim 15, wherein as the damping fluid moves from the first chamber to the second chamber, a first pressure reduction occurs as the damping fluid moves past the sealing surface and a second pressure reduction occurs as the damping fluid moves past the second surface.

19. The damper of claim 15, wherein the first angle of the sealing surface is greater than the second angle of the second surface.

20. A method of metering fluid in a damper, comprising:
passing the fluid from a first side to a second side of a damping fluid chamber through a valve, wherein the valve includes a needle axially movable relative to a valve seat, wherein the needle includes a sealing surface for obstructing the flow of fluid and a second surface including formations longitudinally formed and tapered toward an axis of the needle, the sealing surface tapered at a first angle relative to the axis and the second surface tapered at a second angle relative to the axis;
separating the fluid into substantially separate streams as it passes through the valve; and
permitting the fluid streams to re-join as they exit the valve.

21. The method of claim 20, wherein the valve includes an annular flow path.

22. The method of claim 21, further including reducing a size of the annular flow path through user-adjustment and repeating the separation step.

23. A damper comprising a metering valve, the metering valve having:
a valve seat;
a needle axially movable relative to the valve seat, the needle including a sealing surface for obstructing the flow of fluid and a second surface including formations longitudinally formed and tapered toward an axis of the needle, the sealing surface tapered at a first angle relative to the axis and the second surface tapered at a second angle relative to the axis; and
a flow area between the valve seat and needle, wherein the formations separate damping fluid passing through the valve into separate streams.

24. The damper of claim 23, wherein the valve includes a biasing member that biases the needle in an open position.

25. The damper of claim 24, wherein the biasing member is a spring.

* * * * *